United States Patent
DeLuca (10) Patent No.: US 8,875,283 B2
(45) Date of Patent: Oct. 28, 2014

(54) RESTRICTED ACCESS MEMORY DEVICE PROVIDING SHORT RANGE COMMUNICATION-BASED SECURITY FEATURES AND RELATED METHODS

(75) Inventor: Michael Joseph DeLuca, Boca Raton, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 129 days.

(21) Appl. No.: 13/443,143

(22) Filed: Apr. 10, 2012

(65) Prior Publication Data

US 2013/0269026 A1    Oct. 10, 2013

(51) Int. Cl.
*H04L 29/06* (2006.01)

(52) U.S. Cl.
USPC .......................................................... 726/19

(58) Field of Classification Search
USPC ...................................................... 726/6, 19
See application file for complete search history.

(56) References Cited

U.S. PATENT DOCUMENTS

| | | | |
|---|---|---|---|
| 7,762,470 B2 | 7/2010 | Finn et al. | |
| 2008/0087731 A1 | 4/2008 | Gonzalez et al. | |
| 2008/0303631 A1* | 12/2008 | Beekley et al. | 340/5.74 |
| 2009/0204815 A1 | 8/2009 | Dennis et al. | |
| 2010/0293374 A1 | 11/2010 | Bushby | |
| 2011/0302358 A1* | 12/2011 | Yu et al. | 711/103 |
| 2012/0066749 A1* | 3/2012 | Taugbol et al. | 726/6 |

FOREIGN PATENT DOCUMENTS

| | | |
|---|---|---|
| WO | 2006027723 | 3/2006 |
| WO | 2008021594 | 2/2008 |
| WO | 2010052722 | 5/2010 |

* cited by examiner

*Primary Examiner* — Michael S McNally
(74) *Attorney, Agent, or Firm* — Allen, Dyer, Doppelt, Milbrath & Gilchrist, P.A.

(57) ABSTRACT

A memory device may include a memory, a host interface connector, a short range communication transceiver, and a processor coupled with the memory and the short range communication transceiver. The processor may be capable of storing data in the memory, and reading the data from the memory to the host device via the host interface connector based upon at least one of receiving first authentication data including a password, via the host interface connector, from a memory access application installed on the host device, or receiving second authentication data via the short range communication transceiver without use of the memory access application.

22 Claims, 6 Drawing Sheets

RESTRICTED ACCESS MEMORY DEVICE PROVIDING SHORT RANGE COMMUNICATION-BASED SECURITY FEATURES AND RELATED METHODS

TECHNICAL FIELD

This application relates generally to the field of communications, and more particularly, to electronic devices and related methods that use short range communication such as near field communication (NFC), for example.

BACKGROUND

External data storage devices, such as universal serial bus (USB) flash drives, provide a convenient and relatively inexpensive medium for saving and transporting electronic files between different host computing devices. However, the portability of such storage devices also makes them more susceptible to being misplaced or stolen, which may be particularly problematic where such devices are used for storing sensitive or confidential information.

To provide enhanced security, some USB flash drives provide data encryption so that information stored on the drive is encrypted. More particularly, the information is inaccessible without a corresponding application installed on a host computer that provides an interface for authentication when the flash drive is connected to the host computer. However, despite the existence of such drives, further security or convenience features may be desirable in some instances.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete.

Generally speaking, a restricted access memory device is disclosed herein which may include a memory, a host interface connector, a short range communication transceiver (e.g., a near field communication (NFC) transceiver), and a processor coupled with the memory and the short range communication transceiver. The processor may be capable of storing data in the memory, and reading the data from the memory to the host device via the host interface connector based upon at least one of receiving first authentication data including a password, via the host interface connector, from a memory access application installed on the host device, or receiving second authentication data via the short range communication transceiver without use of the memory access application. As such, the memory device may advantageously provide access to the stored data without the use of NFC communication on host devices where the memory access application is previously installed, as well as on host devices where the memory access application is not installed but short range communication authentication is available.

More particularly, the processor may be capable of installing the memory access application on the host device based upon the short range communication transceiver. Furthermore, the processor may be a cryptographic processor that is further capable of encrypting the data stored in the memory. By way of example, the host interface connector may include a universal serial bus (USB) connector, and the memory may include a flash memory. Also by way of example, the second authentication data may include a password, challenge-response data, etc. The memory device may further include a thumb drive housing carrying the memory, the host interface connector, the short range communication transceiver, and the processor.

A related electronics system is also provided. The system may include a host device, a short range communication device, and a restricted access memory device, such as the one described briefly above. A related method is also provided for a memory device, such as the one described briefly above. The method may include storing data in the memory, and reading the data from the memory to the host device via the host interface connector based upon at least one of receiving first authentication data including a password, via the host interface connector, from the memory access application on the host device, or receiving second authentication data from the short range communication device via the short range communication transceiver without use of the memory access application.

A related non-transitory computer-readable medium for a restricted access memory device, such as the one described briefly above, is also provided. The non-transitory computer-readable medium may have computer executable instructions for causing the memory device to perform steps including storing data in the memory, and reading the data from the memory to the host device via the host interface connector based upon at least one of receiving first authentication data including a password, via the host interface connector, from the memory access application on the host device, or receiving second authentication data via the short range communication transceiver without use of the memory access application.

Figure 1:
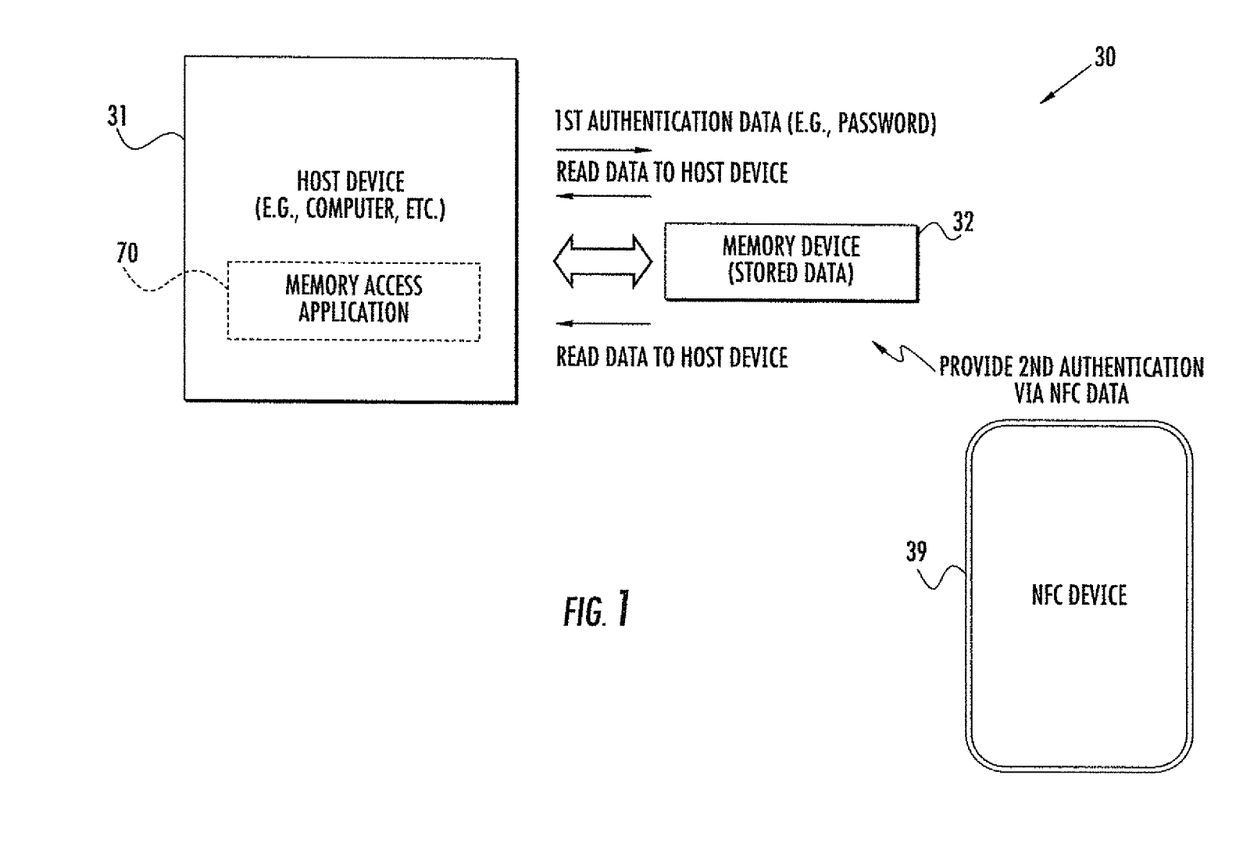
FIG. 1 is a schematic block diagram of an electronics system in accordance with one example aspect, FIG. 2 a schematic block diagram of an example embodiment of the restricted access memory device from the system of FIG. 1.
Figure 2:
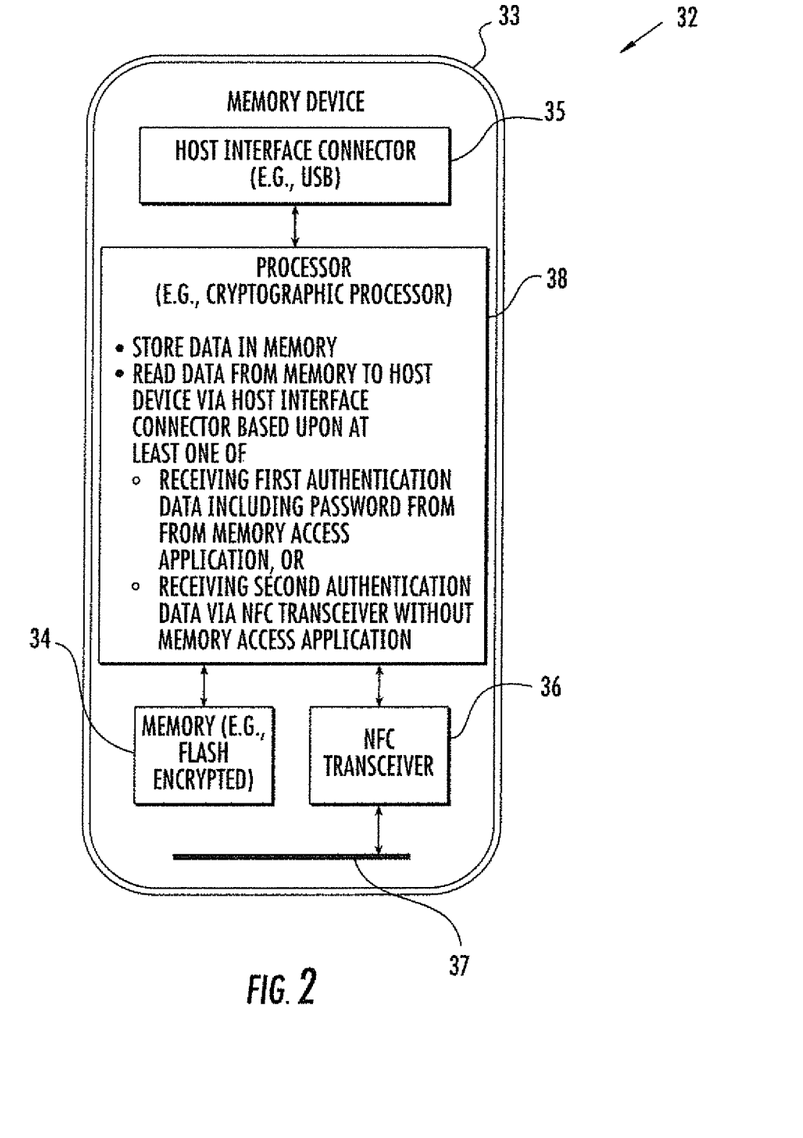

Referring initially to FIGS. 1 and 2, an electronics system 30 and related method aspects are first described. The system 30 illustratively includes a host device 31, such as a desktop or laptop computer, tablet computer, or other device to which a restricted access memory device 32 may be connected. In the example shown in FIG. 2, the memory 32 illustratively includes a housing 33, a memory or memory circuitry (e.g., flash, optical, etc.) 34, a host interface connector 35, a short range communication transceiver, such as a near field communication (NFC) transceiver 36, and associated antenna 37, and a processor 38 coupled with the memory 34, the host interface connector 35, and the NFC transceiver 36. By way of example, the host interface connector 35 may be a universal serial bus (USB) connector (e.g., standard USB, micro USB, etc.), and the host device 31 may be capable of operating as a USB host. More particularly, the memory device 32 may be configured as a USB thumb drive, USB flash drive, or USB optical hard drive, for example. However, it should be noted that other communications formats may be used for communicating data between the memory device 32 and the host device 31, such as an Ethernet connector, a wireless communications interface (e.g., Bluetooth, TransferJet, WiFi), etc. The short range communication transceiver may also use Bluetooth, TransferJet, or WiFi in some embodiments, for example.

By way of example, the processor 38 may be implemented using a combination of hardware (e.g., microprocessor, etc.) and a non-transitory computer-readable medium having computer-executable instructions for performing the various operations described herein. The processor 38 may be capable of storing data in the memory 34, which in some embodiments may include encrypted data. Moreover, in some embodiments the processor 38 may also be capable of cooperating with the host device 31 to install or configure a memory access application 70 on the host device 31 for accessing the stored data. More particularly, the memory access application 70 may be used to read the data from (and optionally write encrypted data to) the memory 34 via the host interface connector 35. That is, the memory access application 70 may be installed on the host device 31 to allow the host device to provide first authentication information, such as a password, for authorizing the memory device 32 to provide the requested encrypted data to the host device 31. By way of example, the password may be provided to the host device 31 via an input device such as a keyboard or keypad, mouse, touch screen, etc. The password may take various forms such as an alphanumeric sequence, a pattern or sequence selection, a spoken word or phrase or other audible input, etc., which verifies that a user is authorized to access the stored data. Other suitable forms of user input may also be used to provide passwords.

In accordance with one example embodiment, the memory device 33 may be an encrypted thumb drive which stores encrypted data in the memory 34 to provide enhanced data protection. The memory access application 70 may be stored on the memory device (e.g., as an executable file, etc.) for installation on the host device 31, or the host device 31 may access the memory access application installation file(s) from another source, such as over the Internet, for example. In some example embodiments, the processor 38 may be a cryptographic processor which performs encryption and decryption of the data that is stored in and retrieved from the memory 34 using suitable encryption techniques, although in other embodiments the encryption and decryption operations may be performed externally to the memory device 32. It should be noted, however, that in some embodiments data encryption capabilities or encrypted data storage need not be used.

One potential drawback of encrypted thumb drives that require installed memory access applications on a host device 31 is that this makes use of the thumb drive on multiple different computers with differing operating systems cumbersome, and in some cases may not be possible. That is, if a user wishes to just briefly access a file from an encrypted thumb drive but is not near a computer with the memory access application 70 already installed, then the user will either have to wait for the installation process (which may not be practical or permissible), or wait until the user is at a computer, etc., where the application has previously been installed. Alternately the memory access application 70 may not be available for or even developed for the computer and/or corresponding operating system of the intended computer which will be used for file access.

In this regard, the system 30 may further include a NFC-enabled device, such as a mobile communications device, which may utilize NFC communication to authorize reading of the encrypted data from the memory 34 to the host device 31 via the host interface connector 35, yet advantageously without use of the memory access application 70. That is, the memory device 32 may advantageously be used to read encrypted data to (or write data from) the host device 31 without having to previously install the memory access application 70 on the host device 31. Yet, the memory access application 70 may optionally be installed on certain host devices 31 so that the memory device 32 may also advantageously be accessed on such devices without a need for a separate NFC-enabled mobile communications device 39. That is, the memory device 32 may advantageously be used similar to a traditional encrypted or otherwise access restricted thumb drive with host devices 31 where the memory access application 70 is already installed, and may still be used on other host devices where the memory access application 70 is not installed so long as the memory device is accessible by the host device and is authenticated via NFC communication using the separate NFC device 39.

Example mobile wireless communications devices which may be enabled for NFC communication and used as the NFC device 39 may include portable or personal media players (e.g., MP3 players, video players, etc.), remote controls (e.g., television or stereo remotes, etc.), portable gaming devices, portable or mobile telephones, smartphones, tablet computers, etc. However, it should be noted that other NFC-enabled devices 39 besides mobile communications devices may also be used with the system 30, such as NFC tokens or cards, etc., in some embodiments.

Figure 3:
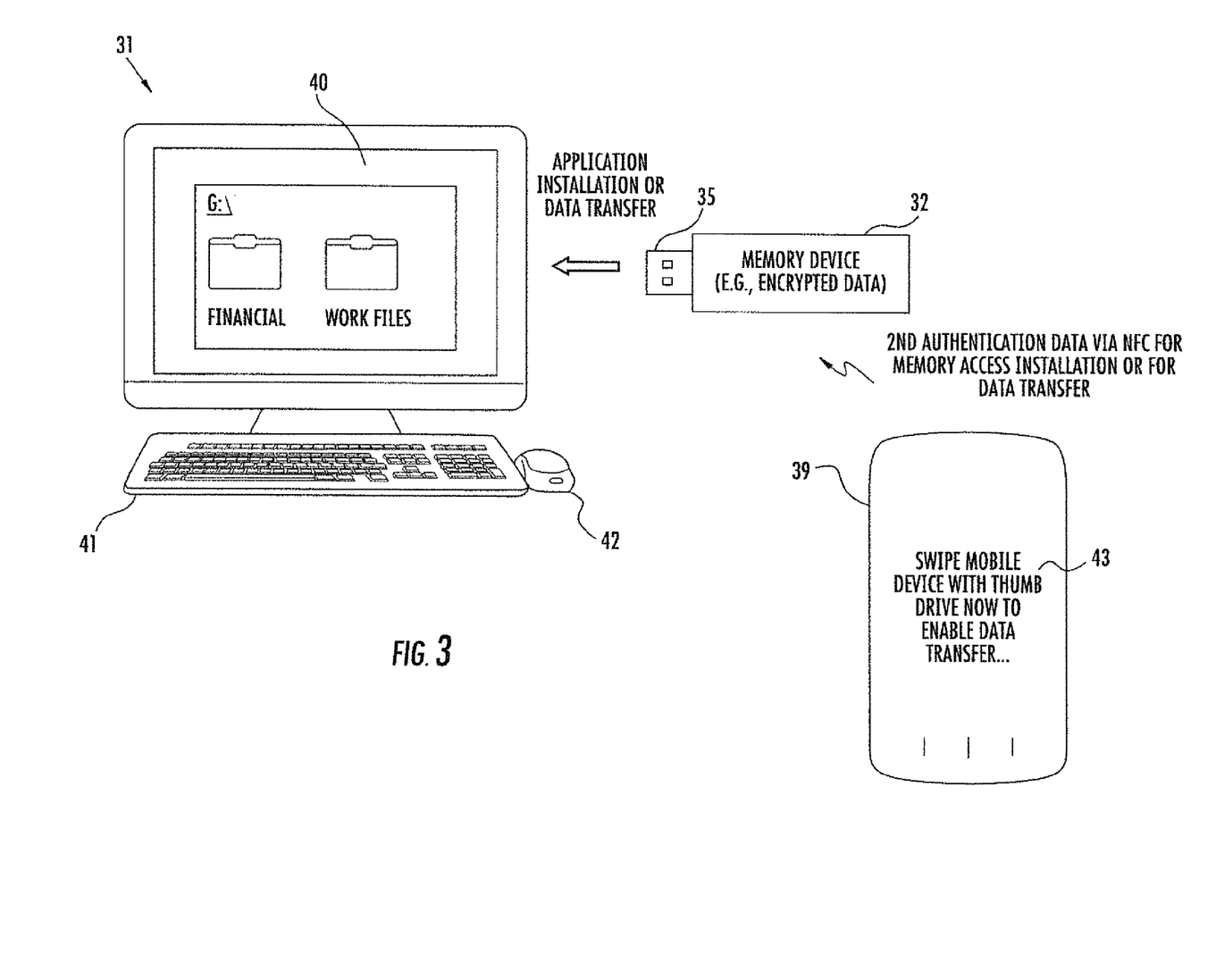
FIG. 3 is a schematic diagram of the system of FIG. 1 illustrating encrypted data transfer resulting from upon NFC-based authorization.
Figure 4:
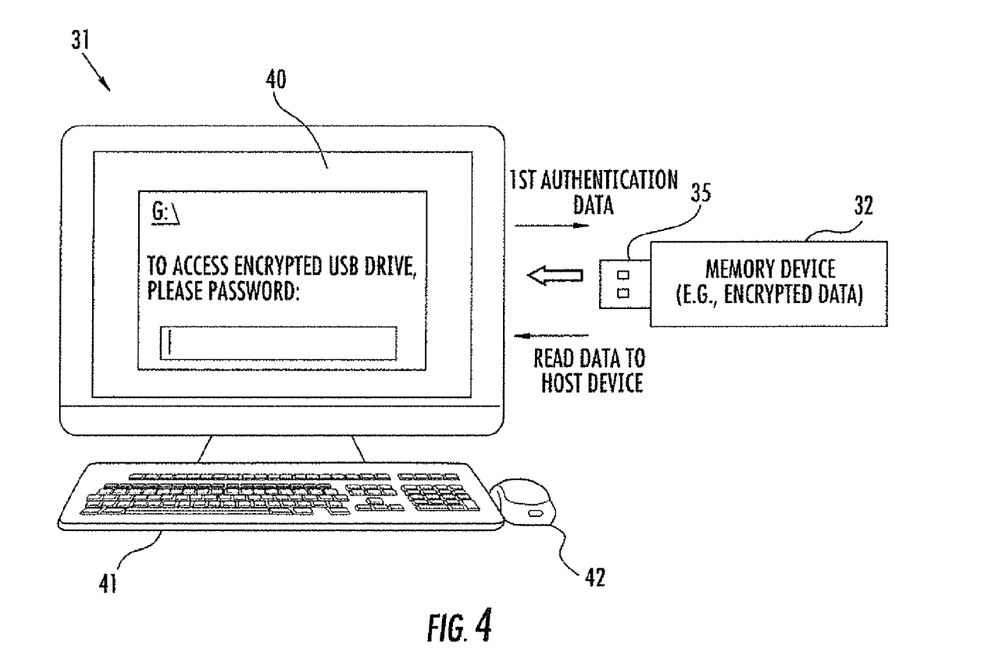
FIG. 4 is a schematic diagram of the system of FIG. 1 illustrating encrypted data transfer based upon authorization from a host device.
Figure 5:
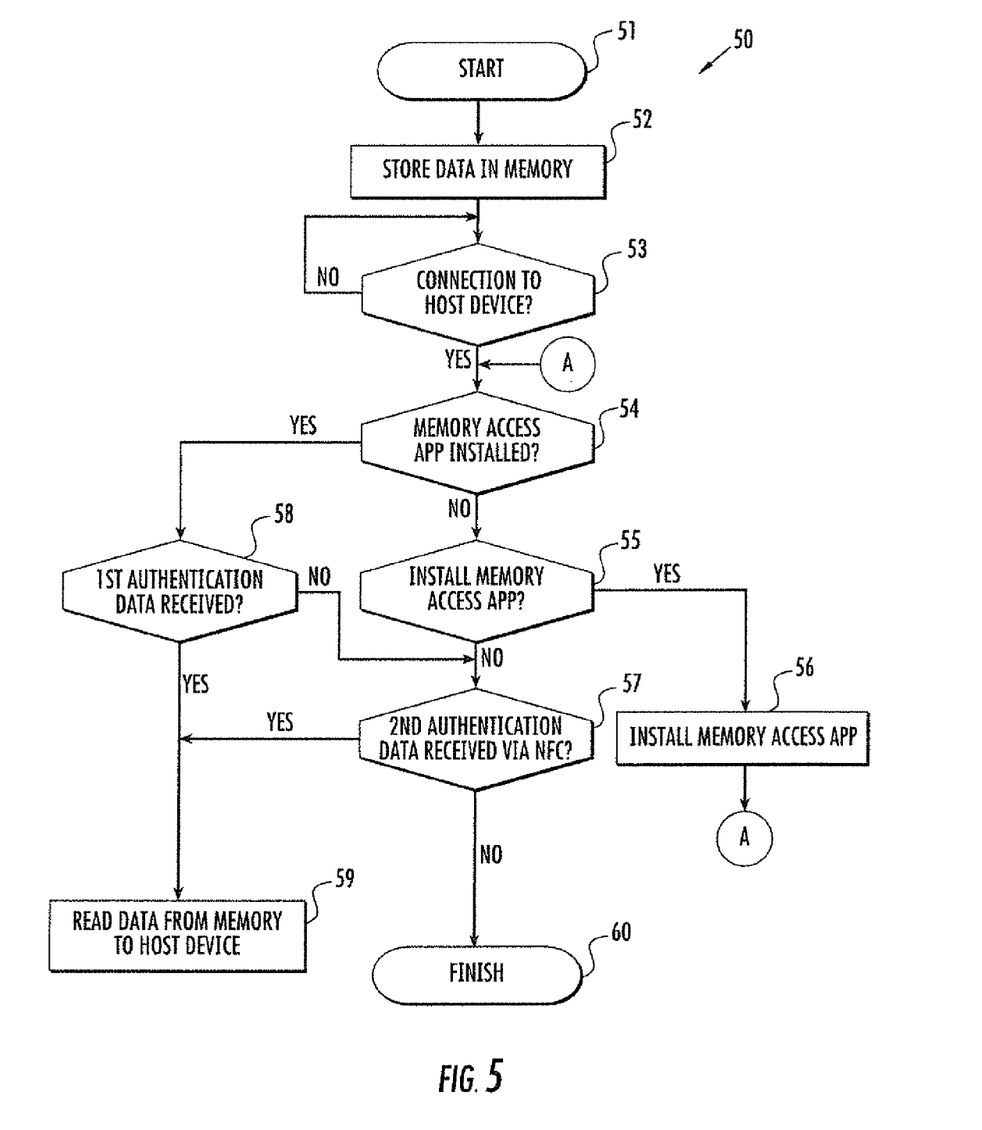
FIG. 5 is a flow diagram illustrating method aspects associated with the system and devices of FIGS. 1-4.

The foregoing will be further understood with reference to examples shown in FIGS. 3 and 4 and the flow diagram 50 of FIG. 5. In the illustrated example, beginning at Block 51, encrypted data is stored on the memory device 32, which in this case is a USB thumb drive, at Block 52. In some instances, the encrypted data may have been stored on the memory device 32 at the time of manufacture, or it may have been stored during a prior connection with a host device 31, for example. In the illustrated examples, the host device 31 is a personal computer having a display 40 and associated keyboard 41 and mouse 42. When the memory device 32 is connected to the host device 31, at Block 53, the memory device may determine if the memory access application 70 has been previously installed on the host device 51, at Block 54, and if not the memory access application 70 may be installed if desired, at Blocks 55-56. More particularly, assuming a compatible computer and operating system, the memory device 32 may load a driver to the host device, which causes the host device 31 to prompt a user if it is desired to run an installation application.

In accordance with another aspect, the NFC device 39 (which in the present example is a NFC-enabled smartphone) may be used to authorize installation of the memory access application 70 on the host device 31, as well as authorize data transfer with the host device 31. For example, if second authentication data is received from the mobile communications device 39 via NFC, then the user may be prompted (either on a display 43 of the mobile communications device or on the display 40 of the host device 31, for example) as to whether installation of the memory access application 70 is desired, or whether data transfer without installation of the memory access application is being authorized, at Blocks 57 and 59. Alternately NFC may enable restricted access to the device if the computer already is able to generally access the memory device with existing non-restricted applications, such as a generic USB memory interface application. In either case, access to the memory device 32 is provided based upon proper NFC authentication, which in the example of FIG. 3, the memory device 32 is recognized as a mass storage device and labeled as a detachable "G:\" drive, which includes encrypted data organized in "financial" and "work files" folders, although other folder or data storage hierarchies may be used in different embodiments. The second authentication data may be an identification (ID) number, key-based challenge-response data, a password as described above, etc., which is exchanged via NFC communication between the NFC device 39 and the NFC transceiver 36.

As noted above, if the memory access application 70 is installed on the host device 31, then the user has the option to perform data reading (or writing) based upon providing appropriate credentials (i.e., first authentication data) through the host device, such as a password (see FIG. 4), challenge-response data, etc., at Block 58. The method of FIG. 5 illustratively concludes at Block 60.

As a result of the above-described configuration, the memory device 32 may advantageously be able to transfer files between host devices 31 on different platforms or having different operating systems. For example, the memory access application 70 may not be available for all desired operating systems (e.g., Windows, iOS, Android, QNX, etc.). Yet, the above-described approach allows for encrypted or otherwise restricted access data to be read by a host device 31 that does not have the memory access application 70 installed based solely upon an authenticating NFC communication, so long as it has an appropriate generic interface driver and a compatible connector for the host interface connector 35. The NFC transceiver 36 may be powered by a USE (or other) interface with the host device 31 when connected thereto. So, in one example use case, the memory device 32 may be plugged into a Windows platform, enabled or authorized for data transfer with a NFC "kiss" from the NFC device 39, and then moved to an Android tablet and similarly authorized for transfer of the files.

The memory device 32 may be paired with a respective NFC device 39 in various ways. For example, when a user buys and registers the memory device 32, a phone number, email address, device PIN, etc., associated with the mobile communications device may be provided, to a registration server, which in turn pushes a password or key down to the device over a communications network (e.g., Internet, cellular network, etc.). In another embodiment, the memory device 32 may be plugged into a host device 31, such as a user's personal computer, and run through an initial programming sequence where it is paired with a respective mobile communications device 39. In still another embodiment, a paired NFC token (e.g., a passive token) may be sold with the memory device 32 (e.g., as a key chain token, etc.), which is pre-configured to provide the second authentication data to the memory device 32.

Example components of a mobile communications device 1000 that may be used in accordance with the above-described embodiments are further described below with reference to FIG. 6. The device 1000 illustratively includes a housing 1200, an optional keyboard or keypad 1400 and an output device 1600. The output device shown is a display 1600, which may include a full graphic LCD. In some embodiments, the display 1600 may have an array of touch sensors associated therewith to define a touch screen that may be used an input device. Various types of display technologies may be used, including three-dimensional (3D) displays, in some embodiments. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
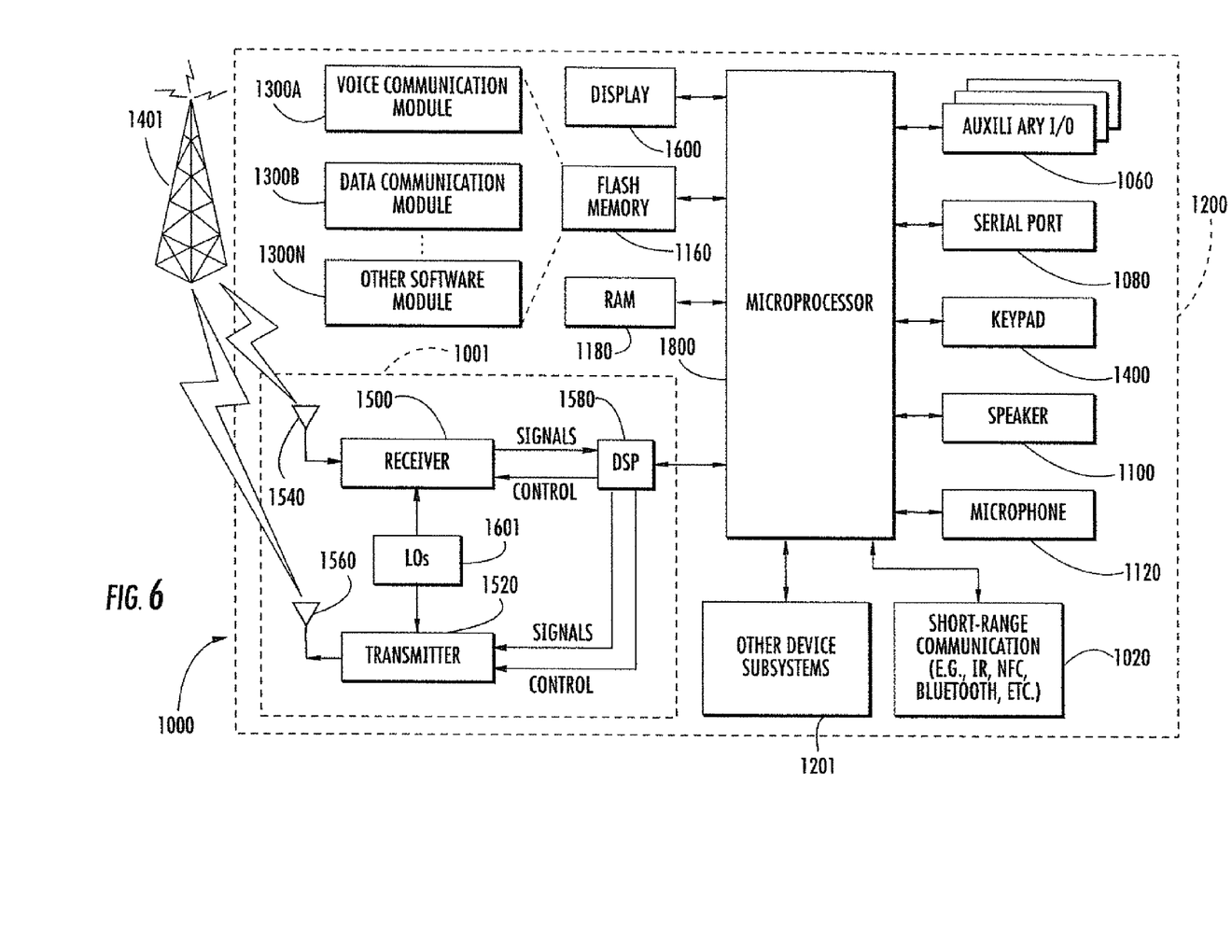
FIG. 6 is a schematic block diagram illustrating example components that may be used with the mobile communications devices of FIGS. 1 and 2.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may include a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, wireless local area network (WLAN) or WiFi, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) communications module for communicating with a NFC device or NFC tag via NFC communications. Other short-range modules may includes a radio frequency identification (RFID) module, a TransferJet module, etc.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A restricted access memory device including:
a memory;
a host interface connector;
a short range communication transceiver; and
a processor coupled with the memory and the short range communication transceiver and capable of
storing data in the memory,
determining if a memory access application is installed on a host device via the host interface connector,
when the memory access application is installed on the host device, reading the data from the memory to the host device via the host interface connector when first authentication data including a password is received, via the host interface connector, from the memory access application, and
when the memory access application is not installed on the host device, causing the memory access application to be installed on the host device based upon receiving a user-initiated installation instruction, and otherwise reading the data from the memory to the host device via the host interface connector when second authentication data is received via the short range communication transceiver without use of the memory access application and the first authentication data.

2. The memory device of claim 1 wherein the processor includes a cryptographic processor that is further capable of encrypting the data stored in the memory.

3. The memory device of Claim 1 wherein the host interface connector includes a universal serial bus (USB) connector.

4. The memory device of Claim 1 wherein the memory includes a flash memory.

5. The memory device of claim 1 wherein the short range communication transceiver comprises a near field communication (NFC) transceiver.

6. The memory device of claim 1 wherein the second authentication data includes a password.

7. The memory device of claim 1 wherein the second authentication data includes challenge-response data.

8. The memory device of claim 1 further including a thumb drive housing carrying the memory, the host interface connector, the short range communication transceiver, and the processor.

9. An electronics system including:
a host device capable of having a memory access application installed thereon;
a restricted access memory device including
a memory,
a host interface connector,
a short range communication transceiver, and
a processor coupled with the memory and the short range communication transceiver and capable of
storing data in the memory,
determining if the memory access application is installed on the host device via the host interface connector, when the memory access application is installed on the host device, reading the data from the memory to the host device via the host interface connector when first authentication data including a password is received, via the host interface connector, from the memory access application, and when the memory access application is not installed on the host device,     causing the memory access application to be installed on the host device based upon receiving a user-initiated installation instruction, and otherwise reading the data from the memory to the host device via the host interface connector when second authentication data is received via the short range communication transceiver without use of the memory access application and the first authentication data.

10. The electronics system of claim 9 wherein the processor includes a cryptographic processor that is further capable of encrypting the data stored in the memory.

11. The electronics system of claim 9 wherein the host interface connector includes a universal serial bus (USE) connector.

12. The electronics system of claim 9 wherein the memory includes a flash memory.

13. The electronics system of claim 9 wherein the short range communication transceiver comprises a near field communication (NFC) transceiver.

14. The electronics system of claim 9 wherein the second authentication data includes a password.

15. The electronics system of claim 9 wherein the second authentication data includes challenge-response data.

16. The electronics system of claim 9 wherein the memory device further includes a thumb drive housing carrying the memory, the host interface connector, the short range communication transceiver, and the processor.

17. A method for a restricted access memory device including a memory, a host interface connector, and a short range communication transceiver, the method including:

storing data in the memory;

determining if a memory access application is installed on a host device via the host interface connector, when the memory access application is installed on the host device, reading the data from the memory to a host device via the host interface connector when first authentication data including a password is received, via the host interface connector, from a the memory access application; and when the memory access application is not installed on the host device, causing the memory access application to be installed on the host device based upon receiving a user-initiated installation instruction, and otherwise reading the data from the memory to a host device via the host interface connector when second authentication data is received via the short range communication transceiver without use of the memory access application and the first authentication data.

18. The method of claim 17 further including encrypting the data to be stored in the memory at the memory device.

19. The method of claim 17 wherein the second authentication data includes at least one of a password or challenge-response data.

20. A non-transitory computer-readable medium for a restricted access memory device including a memory, a host interface connector, and a short range communication transceiver, the non-transitory computer-readable medium having computer executable instructions for causing the memory device to perform steps including:

storing data in the memory;

determining if a memory access application is installed on a host device via the host interface connector, when the memory access application is installed on the host device, reading the data from the memory to a host device via the host interface connector when first authentication data including a password is received, via the host interface connector, from the memory access application; and when the memory access application is not installed on the host device, causing the memory access application to be installed on the host device based upon receiving a user-initiated installation instruction, and otherwise reading the data from the memory to a host device via the host interface connector when second authentication data is received via the short range communication transceiver without use of the memory access application.

21. The non-transitory computer-readable medium of claim 20 further having computer-executable instructions for causing the memory device to perform a step of encrypting the data to be stored in the memory.

22. The non-transitory computer-readable medium of claim 20 wherein the second authentication data includes at least one of a password and challenge-response data.

* * * * *